3,404,538
ENVIRONMENTAL CONTROL SYSTEM
Robert C. Kinsell, Los Angeles, Calif., assignor to The Garrett Corporation, Los Angeles, Calif., a corporation of California
Filed May 15, 1967, Ser. No. 638,357
6 Claims. (Cl. 62—172)

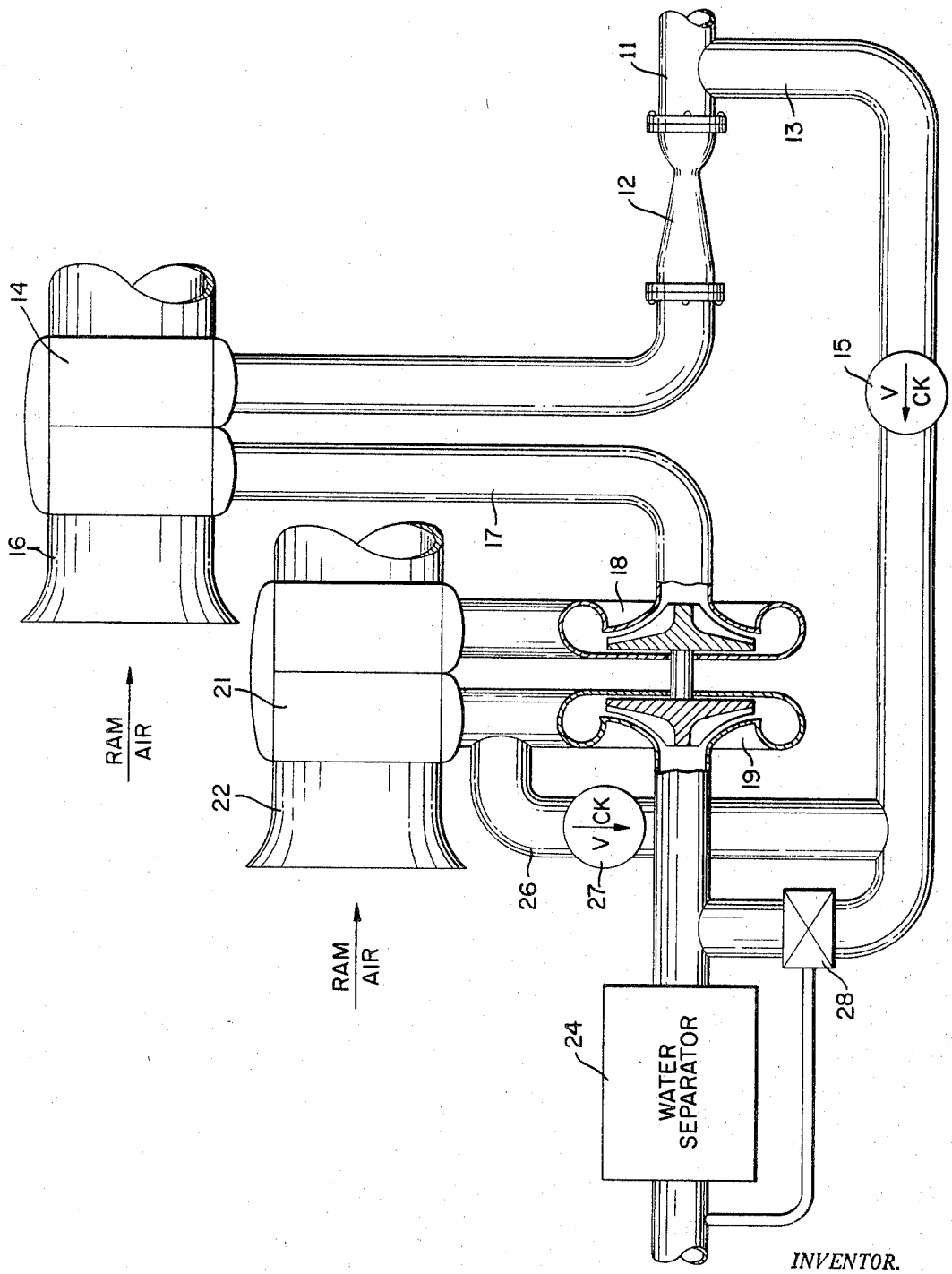

ABSTRACT OF THE DISCLOSURE

In environment control system utilizing precompressed air that is cooled, further compressed, re-cooled and expanded by a turbine-compressor bootstrap system wherein is provided a means for providing cooling and heating with only one modulating bypass valve and two check valves.

---

This invention relates to an environmental control system and, more particularly, to a simplified means in an aircraft air conditioning system that provides maximum heating as well as cooling.

An object of this invention is to provide a simplified, economical environmental control system.

A feature of this invention is the provision of a single modulating valve in the bypass ducts of an environmental control system for providing maximum heating as well as cooling.

Briefly, the invention includes, in combination with a source of hot compressed air, a precooling means for the air, a bootstrap turbine-compression means for further compressing the air, a re-cooling means for re-cooling the air before the air is expanded by the turbine-compression means, and a water separator, the addition of one bypass duct bypassing only the turbine section of the turbine-compressor means. Both bypass ducts feed to a common modulating valve which, in turn, feeds into the main stream and into the water separator. A thermal sensor measures the temperature of the air leaving the water separator and controls the modulating valve to maintain the temperature constant. In order to limit thermal fluctuations a check valve is placed in each bypass duct so that when relatively little heat is required only the higher pressure, lower temperature air from the re-cooling means passes through the modulating valve. Then, as more heat is required, the pressure in this bypass duct drops so that the check-valve in the other by-pass duct allows the hotter air to pass to the modulating valve.

These and other objects and features of advantages of the present invention will become apparent from a review of the following specification and claims when taken in conjunction with the drawing, wherein the sole figure is a diagrammatic sketch of the environmental control system with the novel means.

Referring to the drawing, a main duct 11 is supplied with compressed air, for example, bleed air from a jet engine. The duct 11 feeds to a flow control device 12, for example, a venturi tube, and into a bypass duct 13, having a check valve 15. The compressed air from the flow control 12 is conducted to heat exchanger 14 where the compressed air is cooled to ambient temperature by ram-air passing through a suitable cowling 16. The compressed air leaves the heat exchanger 14 through a duct 17 to be further compressed by a compressor 18. The compressor 18 is powered by a turbine 19 in which the compressed air expands after passing through another heat exchanger 21. Heat exchanger 21 is also cooled to ambient temperature by ram-air that this time passes through cowling 22. Since the air entering turbine 19 is at ambient temperature, the air leaving is colder. This cold air is fed through a water separator 24 and then into, for example, an aircraft cabin to cool and supply fresh air thereto.

During normal operation, the water within the water separator could freeze and thus prevent fresh air from passing through the cabin. To prevent the formation of ice another bypass line 26 is provided to draw compressed air after it leaves heat exchanger 21 and to feed the air past a check valve 27, a modulating valve 28, and into the water separator 24. The modulating valve 28 could be of the type described in U.S. Patent application Ser. No. 573,713, filed Aug. 19, 1966, and assigned to the same assignee as this application. Air from check valve 15 is also fed to valve 28. Briefly, the valve 28 operates as follows: when ice is formed in the water separator the pressure in the duct between turbine 19 and the water separator rises causing the valve 28 to open. Warm-ambient air then enters the water separator 24. Since the pressure in duct 26 is higher than the pressure in duct 13, check valve 15 is held closed. The warm-ambient compressed air passes through valve 27, and, if the ambient temperature is above the dew-point temperature, the ice within the water separator melts. If there happens to be relatively large quantities of ice formed, the valve 28 would open to the extent whereby most of the air would bypass turbine 19, and, in turn, the pressure of the air in duct 26 would drop below the pressure in duct 13. Then check valve 15 opens and hotter air than is available from duct 26 enters the water separator. When less heating is required, modulating valve 28 closes, and cool air from the turbine 19 enters the separator 24. Since the turbine 19 is operating, the pressure in duct 26 builds up until it is greater than the pressure in duct 13. Therefore, when little heat is required, the cooler compressed air from heat exchanger 21 is used for heating. The purpose of check valve 15 is to prevent relatively hot air from entering the cabin which would cause large fluctuations in cabin temperature. The purpose of check valve 27 is obvious as it prevents the hot air from bypassing the modulating valve 28.

With the present disclosure in view, modifications of the invention will appear to those skilled in the art. Accordingly, the invention is not limited to the exact details of the illustrated preferred embodiment but includes all such modifications and variations coming within the scope of the invention as defined in the claims.

What is claimed is:

1. In combination with an environmental control system having means for supplying relatively warm compressed air,
   cooling means for receiving the warm air and cooling it,
   turbine-compressor means for further compressing the air, then re-cooling it, and expanding the air to provide refrigeration, and
   a modulating valve means responsive to the temperature of the air leaving said turbine-compressor means for controlling the temperature thereof,
   the improvements comprising:
   a first bypass means for bypassing some of the air from said cooling means to said modulating valve, and
   a second bypass means for bypassing some of the air from said turbine-compressor means to said modulating valve.

2. In the system of claim 1 wherein:
   means are provided in said first bypass means for allowing the relatively warm compressed air to reach said modulating valve only when the pressure thereof is higher than the pressure of the air in said second bypass means.

3. In the system of claim 1 wherein:
   said first bypass means includes a check valve, and said second bypass means draws air after the air has been compressed and before it has been expanded.

4. In the system of claim 1 wherein:
a check valve is included in each of said bypass means.

5. In the system of claim 3 wherein:
a check valve is included in said second bypass means.

6. In the system of claim 3 wherein:
said second bypass means is further limited to draw air after it is re-cooled,
and a check valve is included in said second bypass means.

References Cited

UNITED STATES PATENTS

| | | | |
|---|---|---|---|
| 2,809,714 | 10/1957 | Sims, Jr. et al. | 62—402 X |
| 2,829,505 | 4/1958 | Oates, Jr. | 62—172 X |
| 2,867,989 | 1/1959 | McGuff | 62—402 X |
| 2,992,542 | 7/1961 | Arthur | 62—402 |
| 3,083,546 | 4/1963 | Turek | 62—402 |
| 3,355,905 | 12/1967 | Berhold | 62—402 |

WILLIAM J. WYE, *Primary Examiner.*